UNITED STATES PATENT OFFICE.

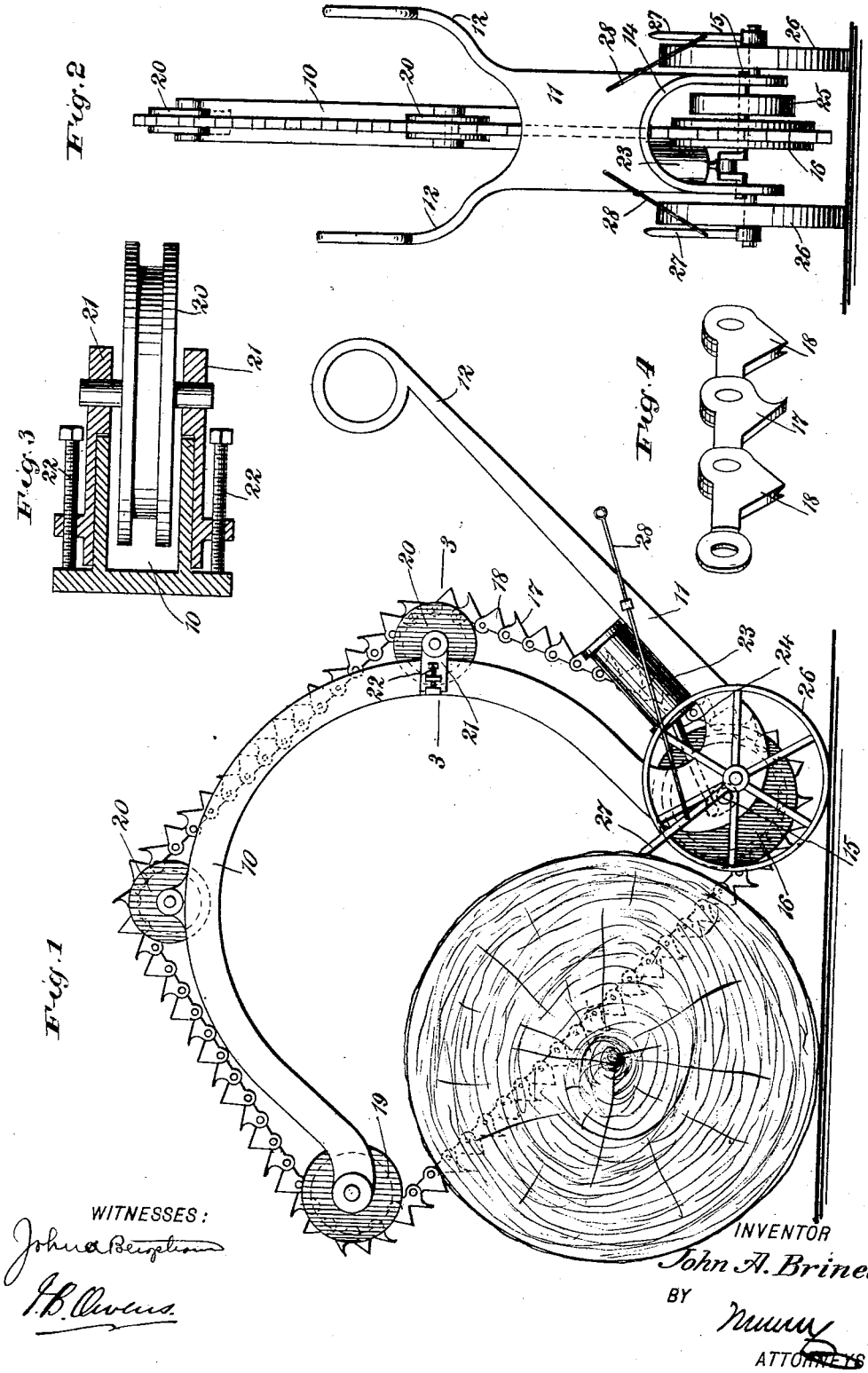

JOHN ARTHUR BRINES, OF FRESNO, CALIFORNIA.

SAWING APPARATUS.

SPECIFICATION forming part of Letters Patent No. 710,838, dated October 7, 1902.

Application filed January 30, 1902. Serial No. 91,856. (No model.)

*To all whom it may concern:*

Be it known that I, JOHN ARTHUR BRINES, a citizen of the United States, and a resident of Fresno, in the county of Fresno and State of California, have invented a new and Improved Sawing Apparatus, of which the following is a full, clear, and exact description.

This invention relates to an apparatus designed, primarily, for sawing across logs and the like, although it may be used for various other purposes, as will be apparent.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the apparatus embodying my invention. Fig. 2 is a rear elevation of the same. Fig. 3 is a section on the line 3 3 of Fig. 1, and Fig. 4 is a detail view of the sawing-chain.

The apparatus is provided with an essentially U-shaped frame 10, which is formed, preferably, of channel-iron, as shown in Fig. 3, and provided at one end with a return-bent extension 11, terminating in handles 12. At the lower end of the extension 11 an opening 14 is formed, and across this opening is extended the cranked shaft 15, which has a grooved wheel 16 fastened thereto. Over the grooved wheel 16 passes a chain, comprising elongated links 17 and 18, of which the former are provided with saw cutting-teeth and the latter with saw drag-teeth. This chain has a straight run, passing between the arms of the frame 10 and around a sheave 19 at the end of the frame opposite the end having the sheave 16. 20 indicates two other sheaves, which are mounted at the bent or upper portion of the frame to carry the chain thereover, as shown in Fig. 1. These sheaves are formed with an annular pocket or recess (see Fig. 3) which receives the saw-chain. One of these sheaves 20 is adjustably carried in slides 21, mounted on the frame 10 adjustably by means of screws 22. (Best shown in Fig. 3.) By means of this arrangement the sheave may be moved inward or outward and the tension of the saw-chain regulated.

23 indicates a motor, which may be of any suitable sort, and this motor is connected by its rod 24 to the crank on the shaft 15.

25 indicates a balance-wheel on the shaft. The connections for supplying the motive fluid to the motor have not been shown, since they form no part of the present invention. By starting the motor the shaft 15 may be turned, and this will impart movement to the saw-chain, causing it to cut through the log, as will be more fully explained hereinafter.

Carrying-wheels 26 are mounted on the frame directly adjacent to the shaft 15 and serve to support the entire apparatus on the ground and permit its transportation from one point to another.

27 indicates dogs which are mounted to swing around axes coincident with the axes of the wheels 26, and 28 indicates any suitable form of hand-controlled devices for throwing the dogs 27 into and out of active position.

In using the invention the operator grasps the handles 12 and moves the device on its wheels 26 up to the log. The handles being then thrown downward the frame is released, so that the run of the chain between the pulleys 16 and 19 may be properly engaged with the log. The motor is then started and the movement of the chain will cause the log to be sawed through. The operator may permit the frame to drop slowly and follow the action of the saw until the log is cut entirely through. The apparatus may be transported easily from place to place by moving it along on the wheels 26, and these wheels also serve as a means for mounting the apparatus and as a pivot for the swinging movement of the frame during the operation of the apparatus.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A sawing apparatus, comprising an essentially U-shaped frame, a cutter mounted thereon, an extension projecting from one end of the U-shaped frame backward toward the bowed portion thereof, said extension forming a handle, and a carrying-wheel mounted adjacent to the juncture between said extension and the U-shaped frame.

2. A sawing apparatus, comprising an essentially U-shaped frame, a cutter carried thereby, a carrying-wheel mounted at one end of the frame and adapted to run on the ground, whereby to support the sawing apparatus, and an extension projected from the frame adjacent to the carrying-wheel and forming a handle to permit manipulation of the cutting apparatus.

3. A sawing apparatus, comprising an essentially U-shaped frame, an endless cutter, guide devices on the frame, said guide devices mounting the cutter to lie in the plane of said U-shaped frame, means for driving the cutter, a carrying-wheel mounted at one end of said U-shaped frame, and an extension projected from said end of the frame and forming a handle to permit manipulation of the sawing apparatus.

4. A sawing apparatus, comprising an essentially U-shaped frame, a cutter mounted thereon, an extension projecting from one end of the U-shaped frame backward toward the bowed portion thereof, said extension forming a handle, a carrying-wheel mounted adjacent to the juncture between said extension and the U-shaped frame, a dog mounted to swing adjacent to the axis of the carrying-wheel, and a hand-operated device for actuating the dog, said device being connected to the dog and projected to and connected with said extension of the frame.

5. A sawing apparatus, comprising an essentially U-shaped frame of channel-iron cross-sectional form, guide-wheels mounted at each end of the frame, additional guide-wheels mounted at the bowed portion of the frame, an endless cutter running over the guide-wheels, said guide-wheels and cutter extending into the channeled side of the frame, means for driving the cutter, and means for mounting the frame.

6. A sawing apparatus, comprising an essentially U-shaped frame of channel-iron cross-sectional form, guide-wheels mounted at each end of the frame, additional guide-wheels mounted at the bowed portion of the frame, an endless cutter running over the guide-wheels, said guide-wheels and cutter extending into the channeled side of the frame, means for driving the cutter, and means for mounting the frame, said latter means comprising a carrying-wheel mounted at the end of one arm of the frame and a frame extension forming a handle projected from the frame adjacent to said carrying-wheel.

7. A sawing apparatus, comprising an essentially U-shaped frame, a cutter mounted thereon, an extension projecting from one end of the U-shaped frame backward toward the bowed portion thereof, said extension forming a handle, and a carrying-wheel mounted adjacent to the juncture between said extension and the U-shaped frame, the said extension being widened at its outer portion and split or bifurcated, the bifurcations extending apart to form two handles proper.

8. A sawing apparatus, comprising an essentially U-shaped frame, a cutter mounted thereon, an extension projecting from one end of the U-shaped frame backward toward the bowed portion thereof, said extension forming a handle, a carrying-wheel mounted adjacent to the juncture between said extension and the U-shaped frame, and a motor mounted on the inner portion of said extension and having connection with the cutter to drive the same.

In testimony whereof I have signed my name to this specification in the presence of two subscribing witnesses.

JOHN ARTHUR BRINES.

Witnesses:
A. B. LUCKEY,
WM. RYAN.